US010006770B2

(12) United States Patent
Hamilton

(10) Patent No.: US 10,006,770 B2
(45) Date of Patent: Jun. 26, 2018

(54) REMOTE LOCATION DETERMINATION SYSTEM

(71) Applicant: The United States of America as represented by the Secretary of the Navy, Washington, DC (US)

(72) Inventor: John Hamilton, Solsberry, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days. days.

(21) Appl. No.: 15/419,392

(22) Filed: Jan. 30, 2017

(65) Prior Publication Data

US 2017/0138738 A1 May 18, 2017

Related U.S. Application Data

(63) Continuation-in-part of application No. 14/053,974, filed on Oct. 15, 2013, now abandoned.

(60) Provisional application No. 61/713,695, filed on Oct. 15, 2012.

(51) Int. Cl.
*G01C 21/16* (2006.01)
*G01S 19/14* (2010.01)
*G01S 19/53* (2010.01)

(52) U.S. Cl.
CPC ............ *G01C 21/165* (2013.01); *G01S 19/14* (2013.01); *G01S 19/53* (2013.01)

(58) Field of Classification Search
CPC ........ G01C 21/165; G01S 19/14; G01S 19/53
USPC .................................... 701/3, 408, 120, 469
See application file for complete search history.

(56) References Cited

U.S. PATENT DOCUMENTS

| | | | |
|---|---|---|---|
| 6,208,937 B1 | 3/2001 | Huddle | |
| 7,062,381 B1* | 6/2006 | Rekow | ................. G01S 13/874 342/126 |
| 2004/0059497 A1* | 3/2004 | Sankrithi | ................. B64C 25/50 701/120 |
| 2012/0253656 A1 | 10/2012 | Brandt | |
| 2014/0249750 A1 | 9/2014 | Hamilton | |
| 2015/0043012 A1* | 2/2015 | Rudow | ................. G01S 17/023 356/614 |

OTHER PUBLICATIONS

Kevin J. Walchko, "Low Costs Inertial Navigation: Learning to Integrate Noise and Find Your Way", Aug. 2002, Thesis, 80 pages.

* cited by examiner

*Primary Examiner* — Gertrude Arthur Jeanglaude
(74) *Attorney, Agent, or Firm* — Christopher A. Monsey

(57) ABSTRACT

A remote geolocation system is provided including an inertial navigation unit (INU) having orthogonally disposed three axis accelerometers/gyroscopes in a strap down configuration in a case, a laser range finder (LRF) aligned with one INU axis, a GPS, and machine instructions that create a virtual INU (VINU) used to determine orientation of the case at an activation point (AP) when the LRF is pointed at a target, take sequences of global positioning satellites (GPS) location data and inertial measuring unit (IMU) orientation measurements from a starting location to the AP, draw a line between the starting location and the AP, identify a longitude line (LL) passing through the line, align one VINU axis with the LL, align another VINU axis with INU detected gravity, and align a remaining VINU axis with the LRF's output at the AP.

7 Claims, 11 Drawing Sheets

REMOTE LOCATION DETERMINATION SYSTEM

CROSS-REFERENCE TO RELATED APPLICATIONS

The present application is a continuation of and claims priority to U.S. patent application Ser. No. 14/053,974, filed Oct. 15, 2013, entitled "NAVIGATIONAL AND LOCATION DETERMINATION SYSTEM" which claims priority to U.S. Provisional Patent Application Ser. No. 61/713,695, filed Oct. 15, 2012, entitled "GPS/IMU BASED NON-MAGNETIC NORTH SEEKER," the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,402) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The field of the invention is generally directed to remote geolocation finding without using a magnetic based North seeking system as well as error determination of accuracy of the remote geolocation determinations.

Embodiments of the invention address a need for remote geolocation and error determination based on an ability to quickly find an accurate heading of a hand carried device without the need for magnetic field measurement. Portable systems capable of being carried by humans in a typical application desired by persons moving across country based on non-magnetic north (or south) seeking systems are not available due to a variety of limiting factors including size, weight, and power. Accordingly, in simplified terms, an invention has been created to provide a needed capability to determine a desired orientation of a sensor at a desired point with respect to the Earth (e.g., true north) based on determination of orientation of a reference axis of a sensor with respect to locations of multiple points and relationships between the multiple points with a significant degree of accuracy using non-magnetic directional sensing, orientation sensing, determinations via global positioning satellites (GPS), and a sequence of measurements along a displaced path which are used to align a virtual inertial navigation unit (INU) having three axis based on orientation sensor systems placed in a strap down configuration and aligned with a laser rangefinder used to determine range to a desired target location. Location can include elevation of the sensor at each point of measurement which can be used in an embodiment. A desired orientation of the sensor at a desired point can include the first point at which a suitably accurate orientation, e.g., true north, can be determined e.g., less than five mil degrees accuracy (e.g., an angular mill can be found by dividing 360 degrees by 6000). A sequence of measurements can include at least two measurements in accordance with an embodiment of the invention along a path of travel which is, for example, not purely vertical in elevation.

An embodiment of the non-magnetic directional sensing, navigational and orientation system can include an inertial navigation system coupled with a GPS system along with a control system adapted for executing a series of computations and generating results in accordance with an embodiment of the invention. Accordingly, multiple measurements and determinations can be made until a predetermined orientation accuracy value has been found to be achieved.

For example, an embodiment can provide a solution to meet unmet needs that include, for simplification purposes, two parts. A first general part includes deriving a series of accurate location, elevation, and heading determinations via GPS. A second part includes accurately capturing an orientation of a sensing device in accordance with an embodiment of the invention and thus a direction that the non-magnetic sensor is pointing or orientated. An embodiment of the invention also includes a system adapted to execute the above parts in a variety of sequences to determine required information that is in turn used to identify with significant precision a needed geodetic or Earth fixed orientation.

An additional embodiment also is adapted to remote sensing of a specific location of an object of interest/location based on a combination of current navigation location/orientation and remote sensing of distance/orientation to the location/object of interest. For example, an embodiment of the invention can provide a remote sensing/determination of position of an object/location of interest based on the non-magnetic based location/navigation/orientation determination capability. An example of remote sensing embodiments can include addition of a laser range finder in addition to an additional set of computations in a control system in accordance with an embodiment of the invention. An exemplary embodiment can determine remote coordinates of an object of interest/location using such an embodiment.

Generally, an embodiment can include a remote geolocation system and related methods including an INU having orthogonally disposed three axis accelerometers/gyroscopes in a strap down configuration in a case, a laser range finder (LRF) aligned with one INU axis, a GPS, and machine instructions that create a virtual INU (VINU) used to determine orientation of the case at an activation point (AP) when the LRF is pointed at a target, take sequences of GPS location data and inertial measuring unit (IMU) orientation measurements from a starting location to the AP, draw a line between the starting location and the AP, identify a longitude line (LL) passing through the line, aligns one VINU axis with the LL, aligns another VINU axis with INU detected gravity, and aligns a remaining VINU axis with the LRF's output at the AP. The aligned VINU, GPS, and LRF are used to determine latitude, longitude, elevation, and position error of the target. Various methods are also provided.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
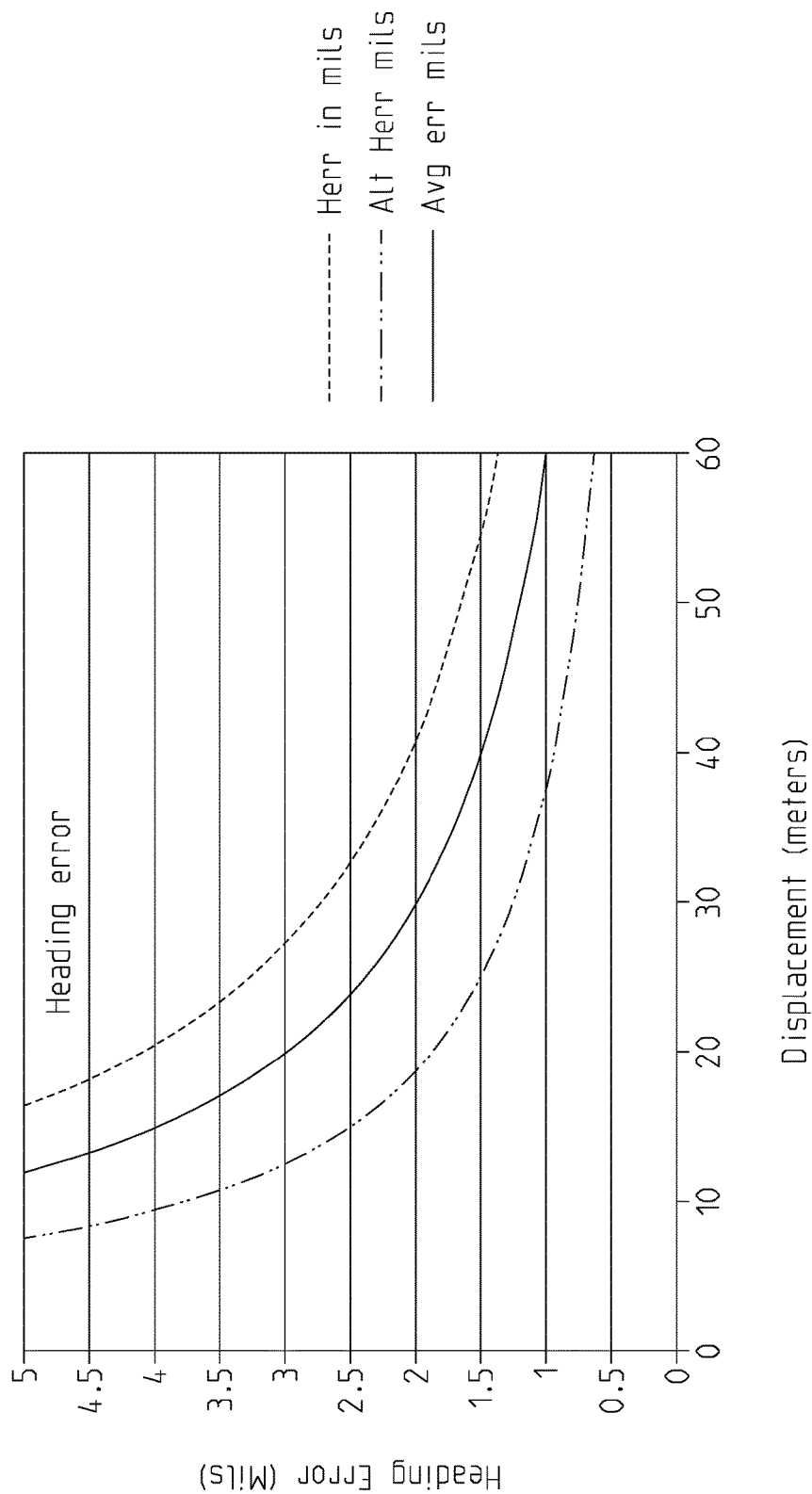
FIG. 1 is a graph showing a resulting heading error as a function of a sampling displacement which is useful in an embodiment of the invention in creating a result having a predetermined degree of non-magnetic direction sensing accuracy.

The embodiments of the invention described herein are not intended to be exhaustive or to limit the invention to precise forms disclosed. Rather, the embodiments selected for description have been chosen to enable one skilled in the art to practice the invention.

Generally, one exemplary embodiment can include a case with a pointing alignment structure, a laser range finder coupled with the case aligned with the pointing alignment structure, a display disposed into the case that displays a plurality of graphical user interfaces, an INU including an IMU placed into a strap down configuration within the case comprising three axis accelerometers, three axis gyroscopes with one of the accelerometer and gyroscope axis', e.g. x-axis, aligned with the alignment structure and the laser range finder's pointing axis. This general embodiment can further include a machine readable storage medium, a processor coupled within the case in communication with the INU and laser range finder which is configured to read a plurality of machine readable instructions and data structures stored in the machine readable recording medium, a control section including a trigger or control that receives an activation input from a user which activates the laser range finder to determine distance to a target when the user points the alignment structure at a target, and a plurality of machine readable instructions. This embodiment further includes a first plurality of machine readable instructions that operates the INU, IMU and GPS; a second plurality of machine readable instructions configured to generate a virtual INU including a three axis x, y, and z data model; a third plurality of machine readable instructions that creates a three dimensional georeferenced map model comprising latitude and longitude information overlaid over terrain that the case is traversed over; a fourth plurality of machine readable instructions that selectively starts recording latitude and longitude data of the case at a plurality of stored location points starting at an initial location point selected by the user using the control section or the graphical user interface along a displacement path that the user carrying the case passes over ending in a final location point; a fifth plurality of machine readable instructions that receives a remote georeferenced determination activation from the control section or one of the graphical user interfaces which activates the laser rangefinder to obtain a target distance measurement between the case and the target at the final location point and determines a path line between the initial location point and the final location point then selects and stores a line of longitude from the map model which passes through the path line as a selected line of longitude data; a sixth plurality of machine readable instructions that rotates the virtual INU via a rotational matrix so that it rotates the virtual INU axis data to rotate/aligns the virtual INU's z axis into a second virtual INU based on inputs from the INU including z axis INU sensor output detecting gravity to rotate the virtual IMU's x, y, and z to co-align respective z-axis; a seventh plurality of machine readable instructions that rotates or aligns the virtual INU y axis with the with the selected line of longitude data; a eighth plurality of machine readable instructions that aligns the x axis of the virtual INU with the laser range finder axis as it points at the target at the final location point; and a ninth plurality of machine readable instructions that determines the target's latitude and longitude location based on target distance measurement, the final location point, and the virtual IMU's three axis that has been aligned with detected gravity, the selected line of longitude, and the laser range finder's axis that was pointing at the target at the final location point. Additional aspects of the invention are directed to determine error of determined remote geolocation of the target using various embodiments of the invention.

Generally, one exemplary invention can determine heading derived from a GPS output by determining location of two collinear points. Generally, an accuracy of this heading in an embodiment is related to three variables: 1. An accuracy in determining latitude; 2. An accuracy in determining longitude; and 3. A distance between the two points.

FIG. 1 shows a graph detailing a resulting heading error as a function of the sampling displacement in accordance with one embodiment of the invention. An assumption of 1 meter GPS accuracy in real-time is a reasonable assumption based on Real Time Kinematic (RTK) updates and/or differential global positioning system (GPS). Heading error ($H_{err}$) in mils was derived using Equation 7, Alternate Heading error (Alt $H_{err}$) mils was derived using Equation 8. Average err mils is the average of the two methods. Alternate heading error can be based on data that GPS devices calculate their position in an Earth Centered, Earth Fixed (ECEF) frame and that the error associated with this frame is comparable to the error associated with a latitude and longitude measurement.

Figure 2:
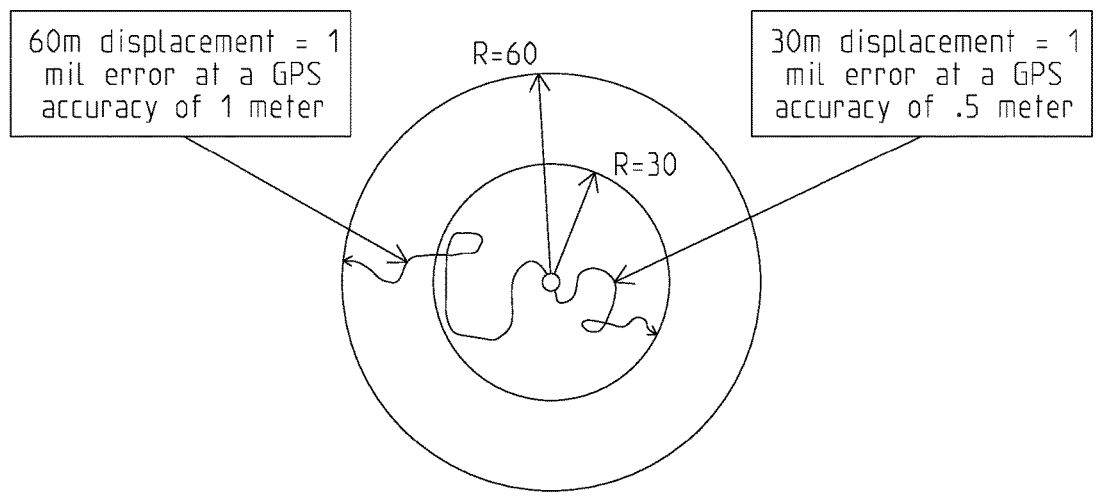
FIG. 2 shows a graph illustrating how heading accuracy is path independent but GPS accuracy dependent which is useful in an embodiment of the invention in creating a result having a predetermined degree of non-magnetic direction sensing accuracy.

In accordance with an embodiment of the invention, displacement discussed in FIG. 1 and shown in FIG. 2 can be any direction and is independent of the path taken. FIG. 2 shows a graph illustrating how heading accuracy is path independent but GPS accuracy dependent in accordance with an embodiment of the invention. Accuracy of heading measured via displacement can be dependent upon accuracy of a GPS. The squiggly line in FIG. 2 shows independence of path taken where, in this embodiment, only a total horizontal straight path distance is displaced (e.g., horizontal displacement is used in calculations to determine orientation and heading). In accordance with one embodiment of the invention, the following equations and FIG. 3 can be used to determine a heading traveled by a non-magnetic compass from GPS data.

Figure 3:
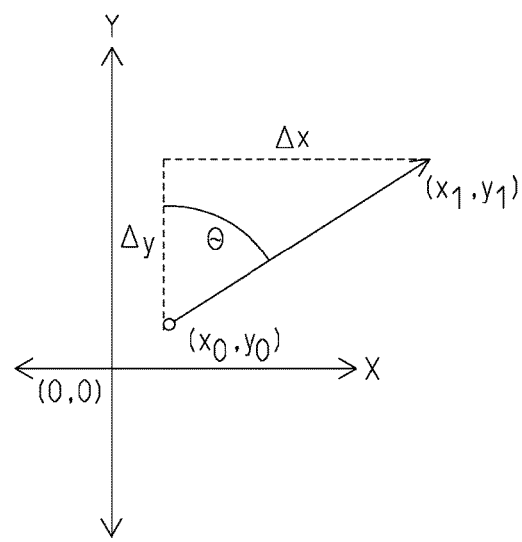
FIG. 3 shows a simplified direction traveled in a two dimensional grid reference dependent which is useful in an embodiment of the invention in creating a result having a predetermined degree of non-magnetic direction sensing accuracy.

FIG. 3 shows a simplified direction traveled in a two dimensional grid reference in accordance with an embodiment of the invention. Referring to FIG. 3, the (x0, y0) and (x1, y1) positions are measured via a GPS device, after which positions in a local level Cartesian (LLC) plane are calculated. The LLC is based on the assumption that the earth is locally flat on the scale that is being measured. The curvature of the earth is 0.013 cm/km, so for displacements of 200 meters or less a LLC assumption or approximation is valid.

In one embodiment of the invention, to convert Δlat to Δy & Δlon to Δx in LLC the below formulas can be used. A midpoint between two latitude or longitude points are labeled ML and equals the latitude/longitude midway between x0,y0 & x0,y1 as in equation 1 (note all latitude and longitude measurements are in degree decimal notations).

$$\begin{cases} MLat = \dfrac{lat_0 + lat_1}{2} \\ MLon = \dfrac{lon_0 + lon_1}{2} \end{cases} \quad \text{Equation 1}$$

Next the change in latitude and longitude are converted to a change in meters. This is done by finding the number of meters per degree of latitude and longitude (MDL). MDL are found with the following equations (note cos(x) is the degree cos and not radian cos):

$$\begin{cases} \dfrac{\text{meters}}{°lon} = 1114151.3 * \cos(MLon) - \\ \quad 945.5 * \cos(3MLon) + 1.2 * \cos(5MLOn) \\ \dfrac{\text{meters}}{°lat} = \dfrac{1111320.9 - 5660.5 *}{\cos(2MLat) + 12.0 * \cos(4MLat)} \end{cases} \quad \text{Equation 2}$$

Then the displacement in North/South (Δy) and East/West (Δx) are calculated using equation 3.

$$\begin{cases} \Delta x = \dfrac{\text{meters}}{°lon} * (lon_0 - lon_1) \\ \Delta y = \dfrac{\text{meters}}{°lat} = *(lat_0 - lat_1) \end{cases} \quad \text{Equation 3}$$

From FIG. 3 the derivation of the heading angle θ can be derived with the use of the inverse tangent function and calculated using equation 4 (note arctan 2 is the 4 quadrant arctangent function).

$$\theta = \arctan 2(\Delta x, \Delta y) \quad \text{Equation 4}$$

The error associated with the heading angle is then found using equations 5 through 9.

$$ML_{err} = \sqrt{(lat_0^{err})^2 + (lat_1^{err})^2} = \sqrt{(lon_0^{err})^2 + (lon_1^{err})^2} \quad \text{Equation 5}$$

$ML_{err}$ is the error term for latitude0±latitude1, longitude0±longitude1, MLat, and MLon.

$$\begin{cases} \left.\dfrac{m}{°lon}\right|_{err} = ML_{err} * \sqrt{\sin(ML)^2 + 9\sin(3ML)^2 + 25\sin(5ML)^2} \\ \left.\dfrac{m}{°lat}\right|_{err} = 2ML_{err} * \sqrt{\sin(2ML)^2 + 4\sin(4ML)^2} \end{cases} \quad \text{Equation 6}$$

$$\begin{cases} \Delta x_{err} = \sqrt{\left(\dfrac{\left.\frac{m}{°lon}\right|_{err}}{\frac{m}{°lon}}\right)^2 + \left(\dfrac{ML_{err}}{lon_0 - lon_1}\right)^2} \\ \Delta y_{err} = \sqrt{\left(\dfrac{\left.\frac{m}{°lat}\right|_{err}}{\frac{m}{°lat}}\right)^2 + \left(\dfrac{ML_{err}}{lon_0 - lon_1}\right)^2} \end{cases} \quad \text{Equation 7}$$

Equation 7 could also be modeled with the knowledge that GPS units do all of their calculations in the ECEF frame and that on the scale of 500 meters or less the earth is locally flat. Thus ΔX, ΔY, and ΔZ each depend on the accuracy of the GPS unit being used. This changes equation 7 to look like equation 8. (Note (ΔX,ΔY,ΔZ) refer to the change displacement as measured in ECEF; not the calculated change of (x,y,z) as measured in the LLC.

$$\begin{cases} \Delta x_{err} = \sqrt{\dfrac{\text{gps\_accuraccy}_{ECEF}}{\Delta X}} \\ \Delta y_{err} = \sqrt{\dfrac{\text{gps\_accuraccy}_{ECEF}}{\Delta Y}} \end{cases} \quad \text{Equation 8}$$

Equation 9 then gives the heading uncertainty associated with the straight line heading between two points.

$$\theta_{err} = \sqrt{\left(\dfrac{\Delta x_{err}}{\Delta x}\right)^2 + \left(\dfrac{\Delta y_{err}}{\Delta y}\right)^2} * \dfrac{1}{1 + \theta^2} \quad \text{Equation 9}$$

The azimuth angle in equation 4, and the corresponding error in equation 9, are in radians and can be converted to degrees or mils with ease, as shown in equation 10.

$$\begin{cases} 1 \text{ mil} = \dfrac{360°}{6400} = 0.05625° \\ 1 \text{ mil} = \dfrac{2\pi}{6400} = 9.817e - 4 \text{ rad} \\ 1° = \dfrac{\pi}{180} \text{ rad} \end{cases} \quad \text{Equation 10}$$

Figure 4:
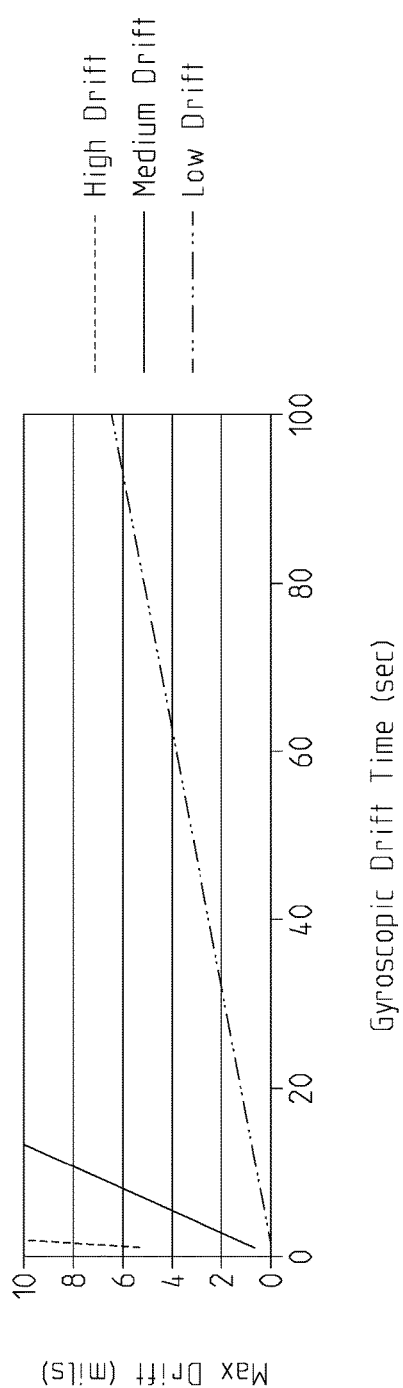
FIG. 4 shows an exemplary embodiment's generation of a simulated gyroscopic drift assuming GPS calibration with no zero velocity updates at 1 m/s dependent which is useful in an embodiment of the invention in creating a result having a predetermined degree of non-magnetic direction sensing accuracy.
Figure 5:
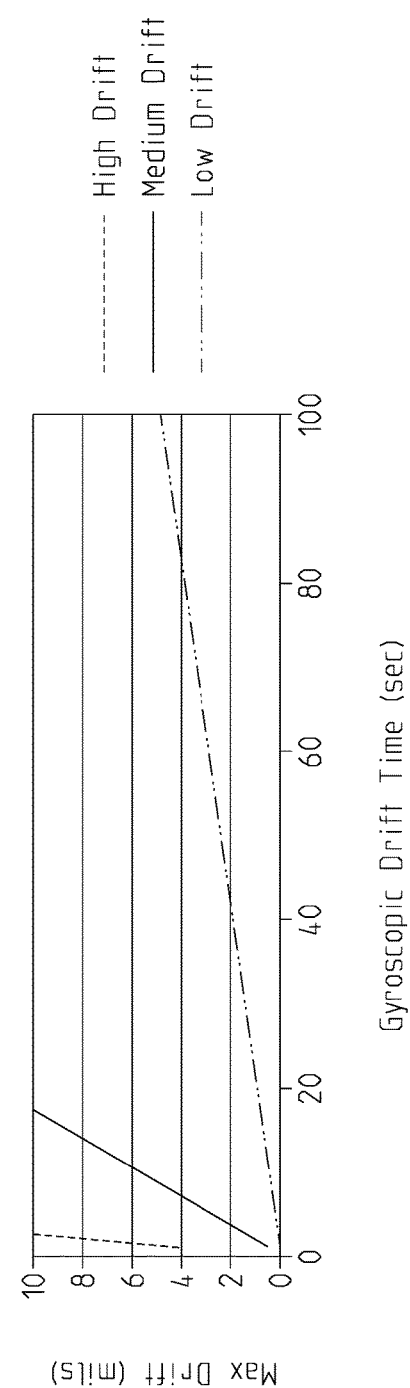
FIG. 5 shows a simulated gyroscopic drift assuming GPS calibration with zero velocity updates for 25% of the time at 1 m/s dependent which is useful in an embodiment of the invention in creating a result having a predetermined degree of non-magnetic direction sensing accuracy.

More particularly, in one embodiment, because the exemplary IMU can include an exemplary integrated GPS, the IMU can self-calibrate via GPS and the dominate error in orientation becomes the accuracy of the gyroscopes. In a calibrated IMU the dominate terms in gyroscopic error are Gyroscopic drift and Angular Random Walk (ARW). FIG. 4 and FIG. 5 show results of these drifts on heading accuracy for three grades of gyroscopes. FIG. 4 shows an embodiment where simulated gyroscopic drift assuming GPS calibration with NO zero velocity updates at 1 m/s. FIG. 5 shows an embodiment with a simulated gyroscopic drift assuming GPS calibration with zero velocity updates for 25% of the time at 1 m/s. These exemplary grades are defined by differing levels of inherent gyroscopic drift, defined as: low grade (1088 deg/h), mid-grade (152 deg/h), and high grade (13 deg/h). Thus, in an embodiment, the total error in heading is the summation of GPS displacement error and gyroscopic drift error.

In an exemplary embodiment, a second part of one aspect of a problem is discerning a heading of a GPS device once the displacement heading is determined. Determining heading in this context can be done taking into account that an IMU in standalone mode can be a relative navigator, but when coupled with an external source, such as GPS, an exemplary embodiment can becomes an absolute navigator. For the non-magnetic compass this exemplary embodiment can be executed by assembling the IMU and GPS device into a strap down configuration and drawing an imaginary reference line through the device. The exemplary reference line's orientation and acceleration can be then tracked from (x0,y0) to (x1,y1) allowing the device to give a heading relative to the imaginary reference line. Once the exemplary reference line's orientation with respect to devices displacement heading is established in an exemplary embodiment of the invention, future orientation can be tracked with the IMU's orientation sensor or gyroscopes. Thus the exemplary device can automatically track GPS and heading once turned on, with no user intervention.

In this embodiment, a user can turn on an exemplary device such that only the z axis of the accelerometer is measuring the acceleration due to gravity. The exemplary imaginary reference line is collinear with the x axis accelerometer and pointed due north. Then, an exemplar system/user can displace the device due East. (Note the z axis measuring gravity, and the x axis pointing north, and East displacement was picked for ease of discussion. Device can be pointed and displaced any direction). Since an x-axis accelerometer was pointed north it measures no acceleration and can only be pointed north or south. With the a prior knowledge of the (x,y,z) accelerometers configuration in an exemplary embodiment of the invention, an embodiment can determine that the x-axis and the reference line are both pointed north during the displacement.

In particular, one exemplary remote geolocation system in accordance with an embodiment of the invention can include a case formed with an aiming structure (e.g., a sighting structure) fixed with respect to a frame of the case having an aiming axis. The system can further include an INU disposed within the case where the INU comprises an inertial navigation system (INS) and/or an IMU as well as a GPS. This exemplary INU includes three accelerometers and three gyroscopes, where the accelerometers and gyroscopes each respectively are aligned along one of three axis comprising a first, second, and third axis that are each orthogonally aligned and rigidly fixed in position with respect to the case in a strapped down configuration. One of the first axis of each of the accelerometers and gyroscopes are collinearly aligned with the aiming axis. The exemplary system further includes a control system, a graphical user interface, a processor, and a machine readable recording medium storing a plurality of non-transitory machine readable instructions adapted to operate the IMU, the graphical user interface, and the control system and determine an actual orientation of the aiming axis of the apparatus aligned with the aiming structure at selected geographic location points the case occupies after travel between a plurality of the geographic location points comprising an initial point and a final point. The final point is a location that a user initiated a command or action to read or determine the actual orientation.

This exemplary embodiment's plurality of non-transitory machine readable instructions include a first plurality of non-transitory machine readable instructions operable to commence identifying a true north reference line data starting with making a first and second determination of latitude and longitude data from the GPS respectively for an initial location point and a final location point, determining a first displacement path line data between the initial and the final points, overlying the first displacement path on a reference frame data with at least one longitude line associated with a Geocentric reference frame passing through the first displacement path data, and determining a first true north based azimuth angle defined by comparing the at least one longitude line and the first displacement path line data. This embodiment can include a second plurality of non-transitory machine readable instructions operable to determine a Geocentric azimuth data line associated with the aiming axis at the final point based on processing sequences adapted for creating a virtual IMU reference model data structure having a fourth, fifth, and sixth axis data and aligning the sixth axis data with respect to gravitational force sensed by the IMU starting at the initial point. An embodiment of the invention can include a third plurality of non-transitory machine readable instructions adapted for determining a second displacement path line data between the initial and the final points based on a first plurality of first, second and third axis IMU measurements comprising measurements from the accelerometers and the gyroscopes starting at the initial point and ending at the final point. This embodiment further includes a fourth plurality of non-transitory machine readable instructions adapted to associate and align the fifth axis data with the second displacement path line data, where the fourth axis is orthogonal to the fifth and sixth axis. This embodiment further includes a fifth plurality of non-transitory machine readable instructions that determines a plurality of orientation data associated with the IMU's first, second, and third axis at least at the initial point and the final point. This exemplary embodiment further includes a sixth plurality of non-transitory instructions that infers and determines a second true north based azimuth angle between the aiming axis and the true north reference line data based on aligning at least some of the axis data in the first displacement path line data, the second displacement path line data, and the virtual IMU reference model data structure. This embodiment further includes a seventh plurality of non-transitory machine readable instructions operable to determine an orientation of the fourth, fifth, and sixth axis data associated with the virtual IMU reference model data structure at the final point, where the fifth axis is aligned with the second displacement path which is in turn aligned with the first displacement path. The fourth axis data is aligned to be orthogonal with the fifth and sixth. The fifth axis data is associated with azimuth of the virtual model axis. The fourth axis is associated with elevation angle and the sixth axis is aligned with the gravitational field. The exemplary embodiment further includes an eighth plurality of non-transitory machine readable instructions operable for determining the aiming axis at the final point with respect to the geocentric reference frame based on fourth, fifth, and sixth axis data based on rotating the fourth, fifth, and sixth axis data to align with the first, second, and third axis data, wherein resulting rotational axis angles comprise azimuth and elevation angle of the aiming axis at the final point. This exemplary embodiment further includes a ninth plurality of non-transitory machine readable instructions operable for determining and displaying on the graphical user interface a maximum amount of error associated with the azimuth and elevation angle of the aiming axis at the final point based on at least two non-collocated GPS location measurements associated with gyroscopic drift and Angular Random Walk (ARW) associated with the gyroscopes and the accelerometers. This exemplary embodiment further includes a tenth non-transitory plurality of processing sequences adapted for determining and displaying elevation of the apparatus at each point of a sequence of measurements by the INS. In at least some exemplary embodiments, the sequence of measurements can include at least two measurements along the first displacement path line data which is not purely vertical in elevation.

An exemplary system having one meter GPS accuracy could include an embodiment where a user travels at a heading of 90° for 60 meters for 60 seconds. An exemplary device can measure 90°±1 mil according to GPS displacement. Then a user, within 3 seconds of stopping, points the device, and the imaginary reference line at an object in the distance. The exemplary device measures the change in orientation from the heading traveled to the direction pointed and returns a compass heading of 23.5°±4.2 mils. The ±4.2 mils is composed of 1 mil error from the displacement and 2.8 mils error from the gyro drifting during the first 60 seconds and 0.14 mils error during the 3 seconds used to acquire a heading sight.

In another exemplary system with an assumption of 0.5 meter GPS accuracy, a user would need to displace 30 meters instead of 60 meters. This would give a heading of 23.5°±2.6 mils. The ±2.6 mils is composed of 1 mil error from the displacement and 1.44 mils error from the gyro drifting during the first 30 seconds and 0.14 mils error during the 3 seconds used to acquire a heading sight.

Figure 6:
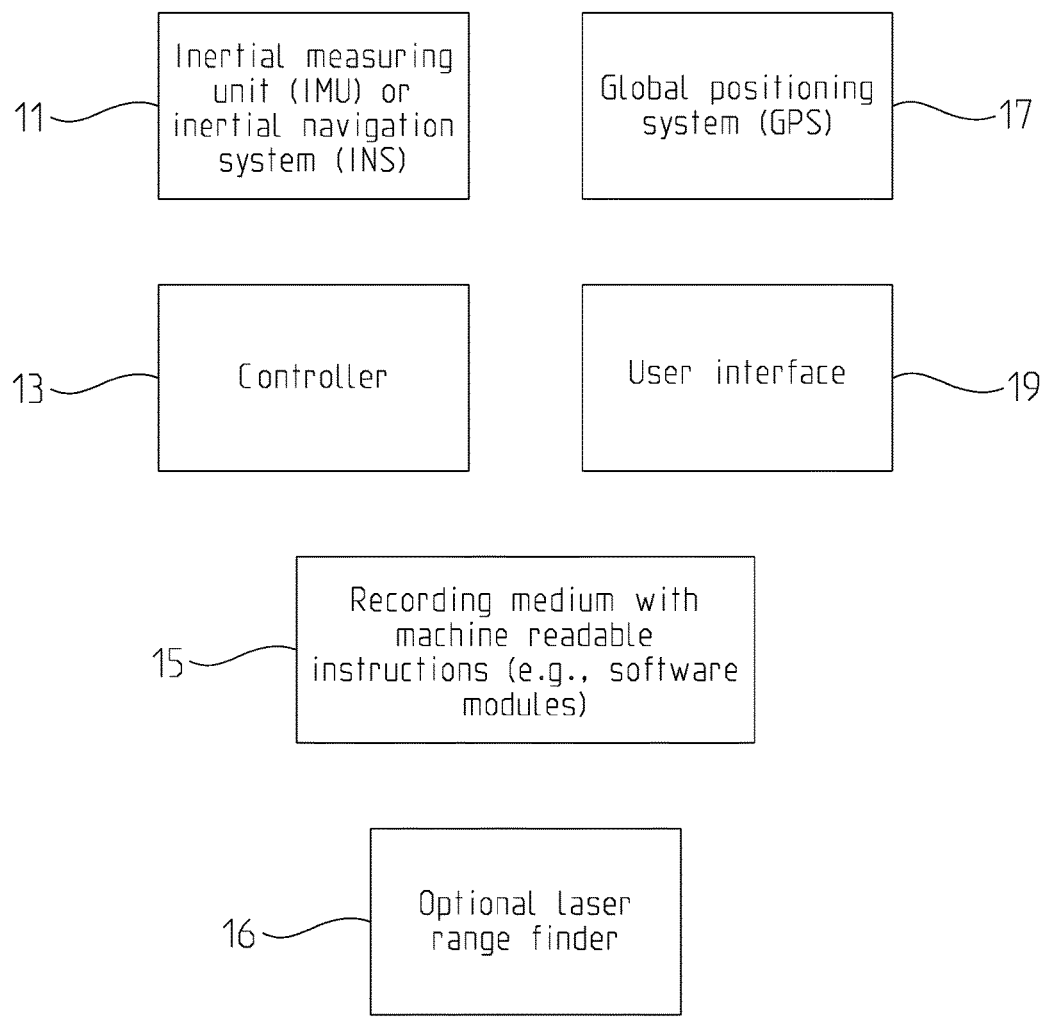
FIG. 6 shows a block diagram of system components in accordance with one embodiment of the invention.

FIG. 6 shows a block diagram of a system in accordance with one embodiment of the invention. An IMU or INS 11, GPS 17, controller 13, user interface 19, and recording medium containing machine readable instructions in accordance with an embodiment of the invention 15 is shown. An alternative embodiment can include a laser range finder which is coupled to the system to perform additional functionality such as discussed herein.

Figure 7:
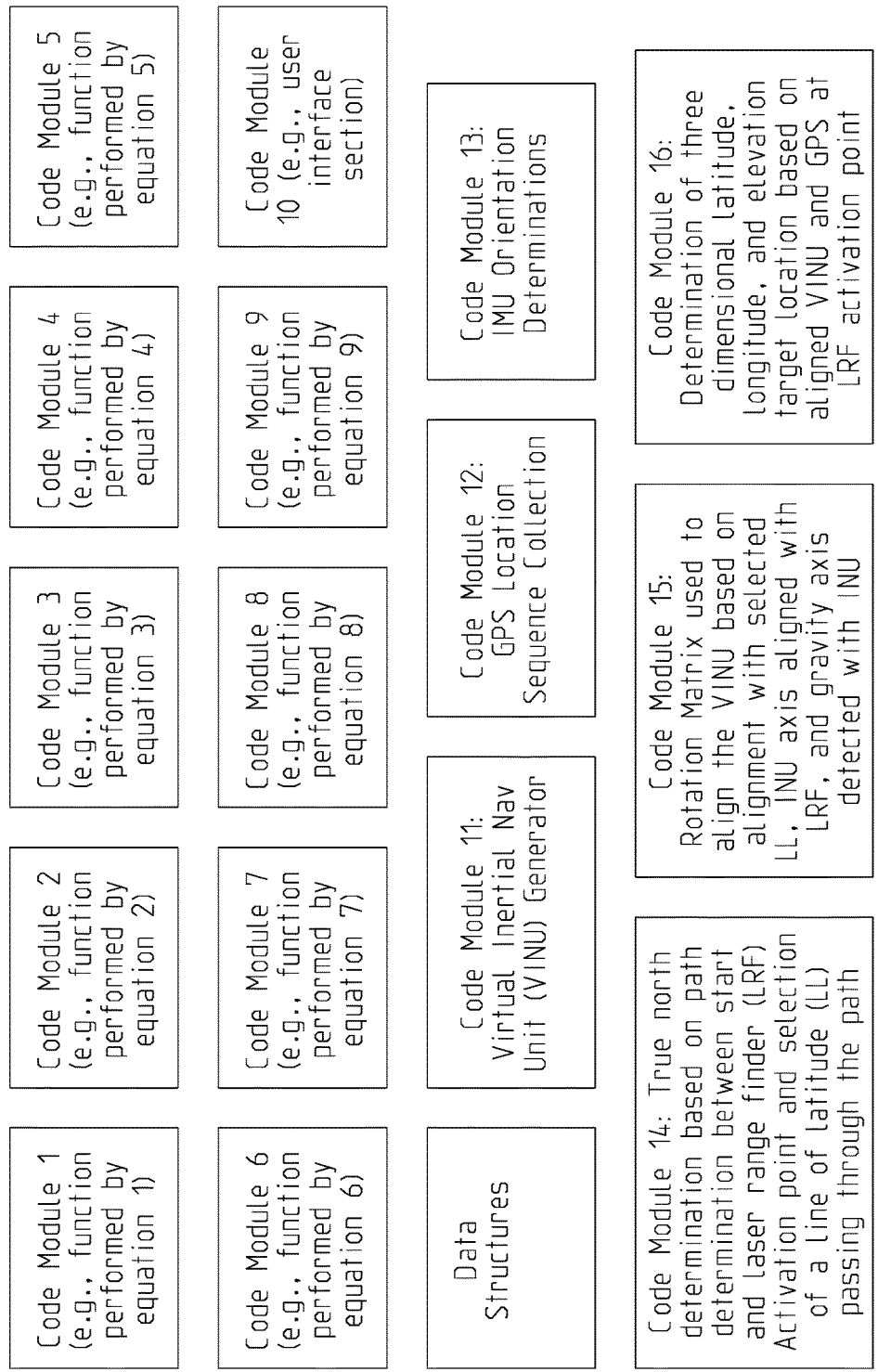
FIG. 7 shows machine readable instructions organized by software code modules in accordance with an embodiment of the invention.

FIG. 7 shows a block diagram of code blocks in accordance with one embodiment of the invention. Machine readable instructions in accordance with an embodiment of the invention can include Code Module 1 (e.g., function performed by equation 1), Code Module 2 (e.g., function performed by equation 2), Code Module 3 (e.g., function performed by equation 3), Code Module 4 (e.g., function performed by equation 4), Code Module 5 (e.g., function performed by equation 5), Code Module 6 (e.g., function performed by equation 6), Code Module 7 (e.g., function performed by equation 7), Code Module 8 (e.g., function performed by equation 8), Code Module 9 (e.g., function performed by equation 9), Code Module 10 (e.g., User Interface Section), and Data Structures storing data in accordance with an embodiment of the invention. Code module 11: Virtual Inertial Navigational Unit (VINU) Generator. Code module 12: GPS Location Sequence Collection. Code module 13: IMU Orientation Determinations. Code module 14: True north determination based on path determination between start and laser range finder (LRF) Activation point and selection of a line of latitude (LL) passing through the path. Code module 15: Rotational Matrix used to align the VINU based on alignment with selected LL, INU axis aligned with LRF, and gravity axis detected with INU. Code module 16: Determination of three dimensional latitude, longitude, and elevation target location based on aligned VINU and GPS at LRF activation point. Machine instructions that create a VINU are used to determine orientation of the case at an activation point (AP) when the LRF is pointed at a target, take sequences of GPS location data and IMU orientation measurements from a starting location to the AP, draw a line between the starting location and the AP, identify a longitude line (LL) passing through the line, aligns one VINU axis with the LL, aligns another VINU axis with INU detected gravity, and aligns a remaining VINU axis with the LRF's output at the AP. The aligned VINU, GPS, and LRF are used to determine latitude, longitude, elevation, and position error of the target.

Figure 8A:
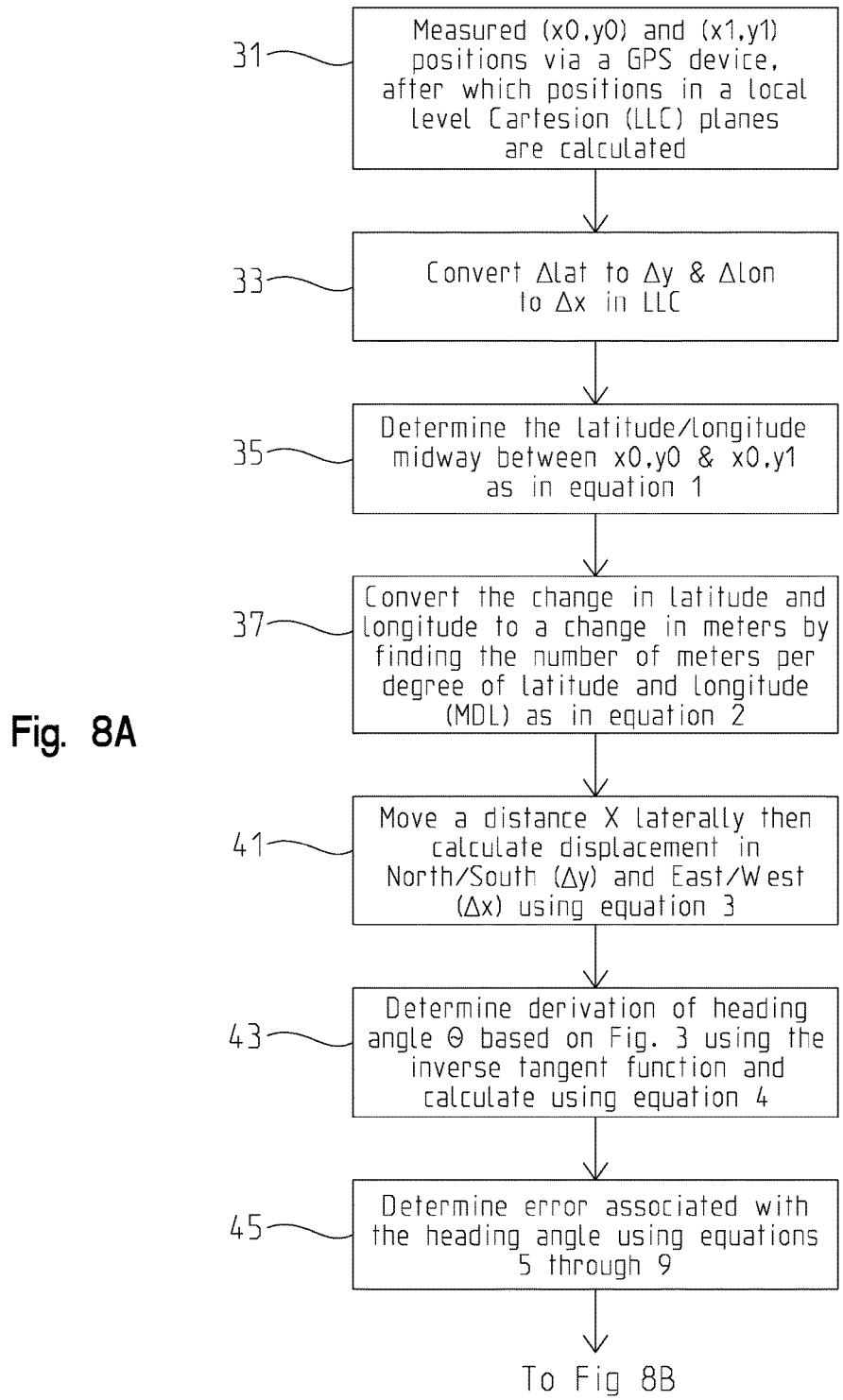
FIG. 8A shows a flow chart for performing processing according to one embodiment of the invention.
Figure 8B:
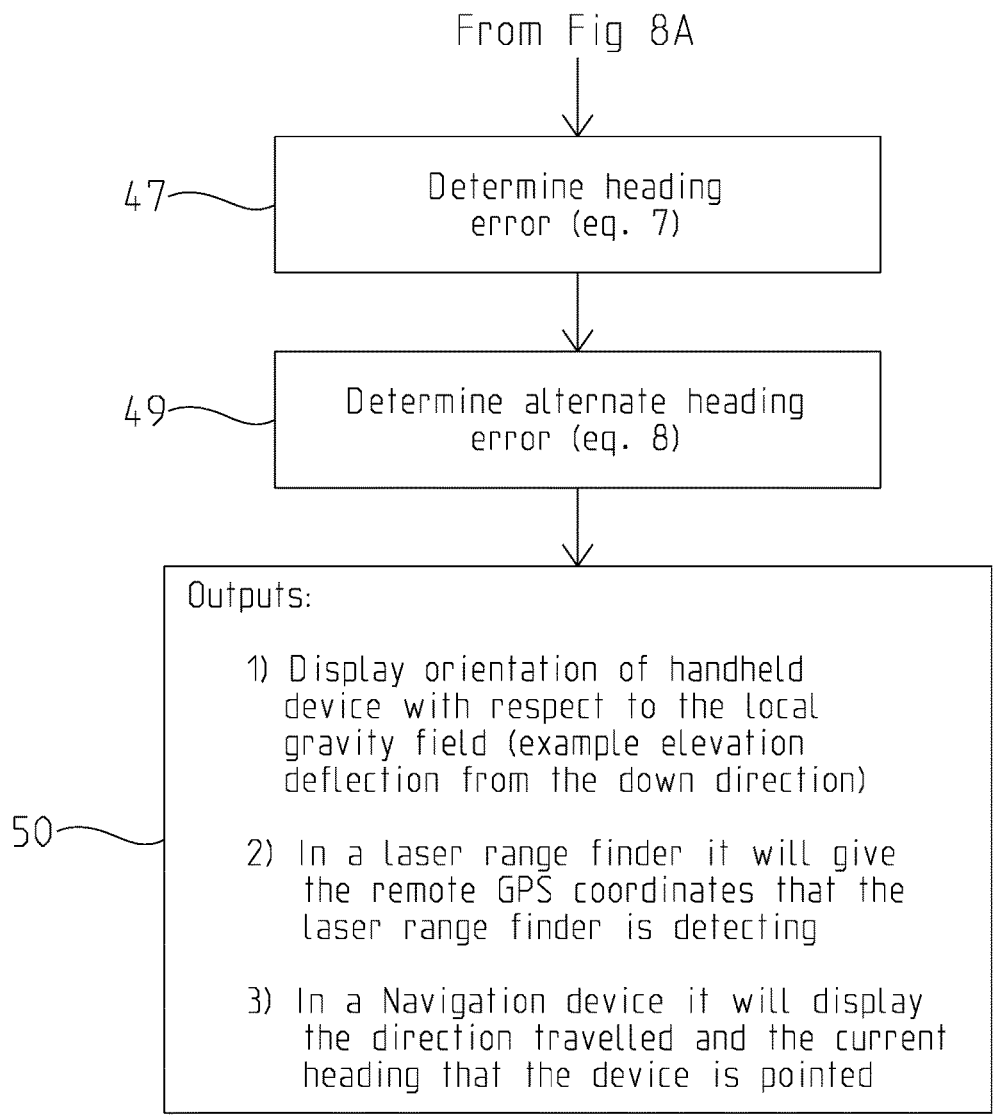
FIG. 8B shows a continuation of the FIG. 8A flow chart for performing processing according to another embodiment of the invention.

FIGS. 8A and 8B show a processing sequence in accordance with one embodiment of the invention. Step 31 includes processing including acquiring measured (x0,y0) and (x1,y1) positions via a GPS device, after which positions in a local level Cartesian (LLC) plane are calculated. Step 33 includes processing which includes convert Δlat to Δy & Δlon to Δx in LLC. Step 35 includes processing including determine the latitude/longitude midway between x0,y0 & x0,y1 as in equation 1. Step 37 includes processing including convert the change in latitude and longitude to a change in meters by finding the number of meters per degree of latitude and longitude (MDL) as in Equation 2. Step 41 includes processing including moving a distance X laterally then calculating displacement in North/South (Δy) and East/West (Δx) using equation 3. Step 43 includes processing including determine derivation of heading angle θ based on FIG. 3 using the inverse tangent function and calculate using equation 4. Step 45 includes processing including determine error associated with the heading angle using equations 5 through 9. Step 47 includes processing including determine heading error (Equation 7). Step 49 includes processing including determine alternate heading error (Equation 8).

Referring to FIG. 8B, shows another embodiment of the invention to include output following processing in accordance with one embodiment of the invention, such as shown in FIG. 8A. Several outputs 50 are shown including a display orientation of handheld device with respect to true north and angle of elevation with respect to a local gravity field (example elevation deflection from the down direction). Another exemplary output can include a system having a laser range finder that can provide remote GPS coordinates that the laser range finder is detecting. Another exemplary embodiment output can include a navigation device that can display a direction travelled and a current heading that a sensor device is pointed.

Figure 9:
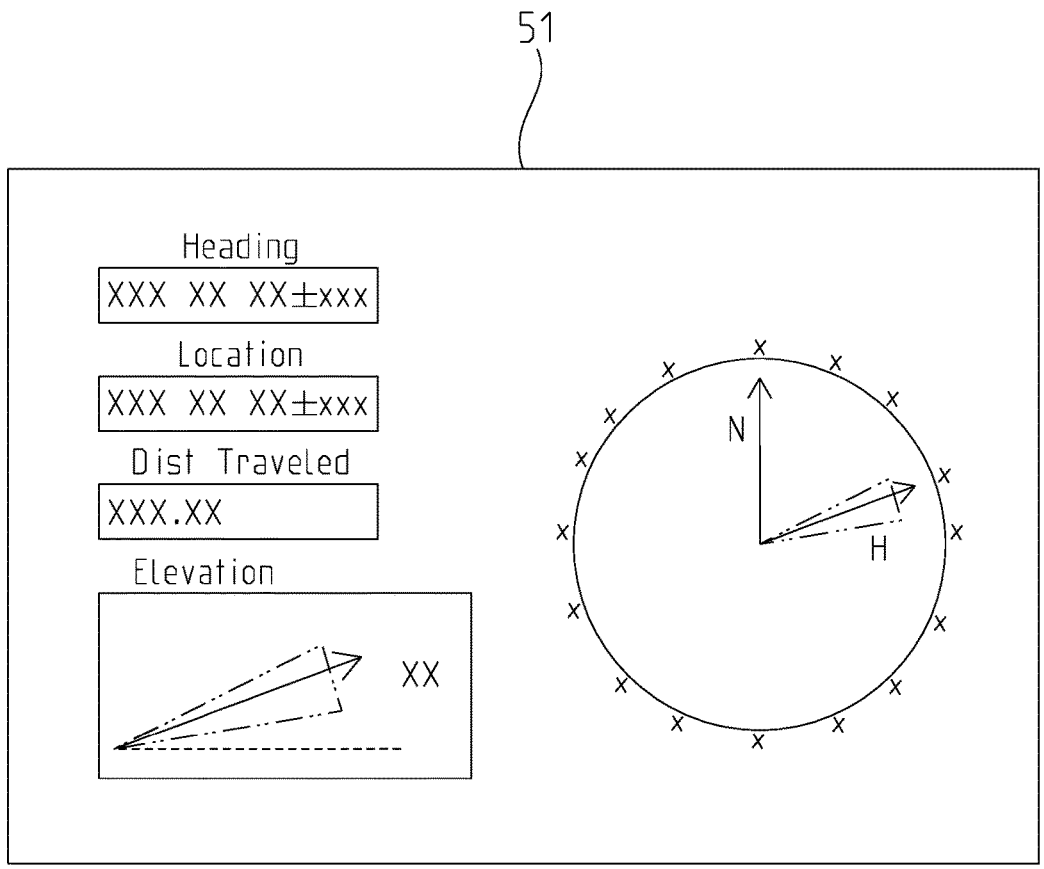
FIG. 9 shows a navigation display in accordance with one embodiment of the invention.

FIG. 9 shows a navigation display in accordance with one embodiment of the invention. An exemplary display includes a Digital Display of Heading of Device Orientation in Degrees, Minutes, Seconds, or Degrees Decimal±Current uncertainty in heading/orientation. The exemplary display also Current GPS location in In Degrees, Minutes, Seconds, or Degrees Decimal±Current uncertainty in location. Distance traveled+units is also shown. An exemplary display also includes a symbol representing the elevation orientation with respect to local gravity field or the down direction. Shading represents uncertainty in elevation. XX=Digital display of elevation 0°=Flat 90°=straight up. Compass style representation of Heading/Orientation as well as N=True North, H=Heading/Orientation, Little 'x'=Degrees on the compass, and Shaded triangle=Uncertainty in heading.

Figure 10:
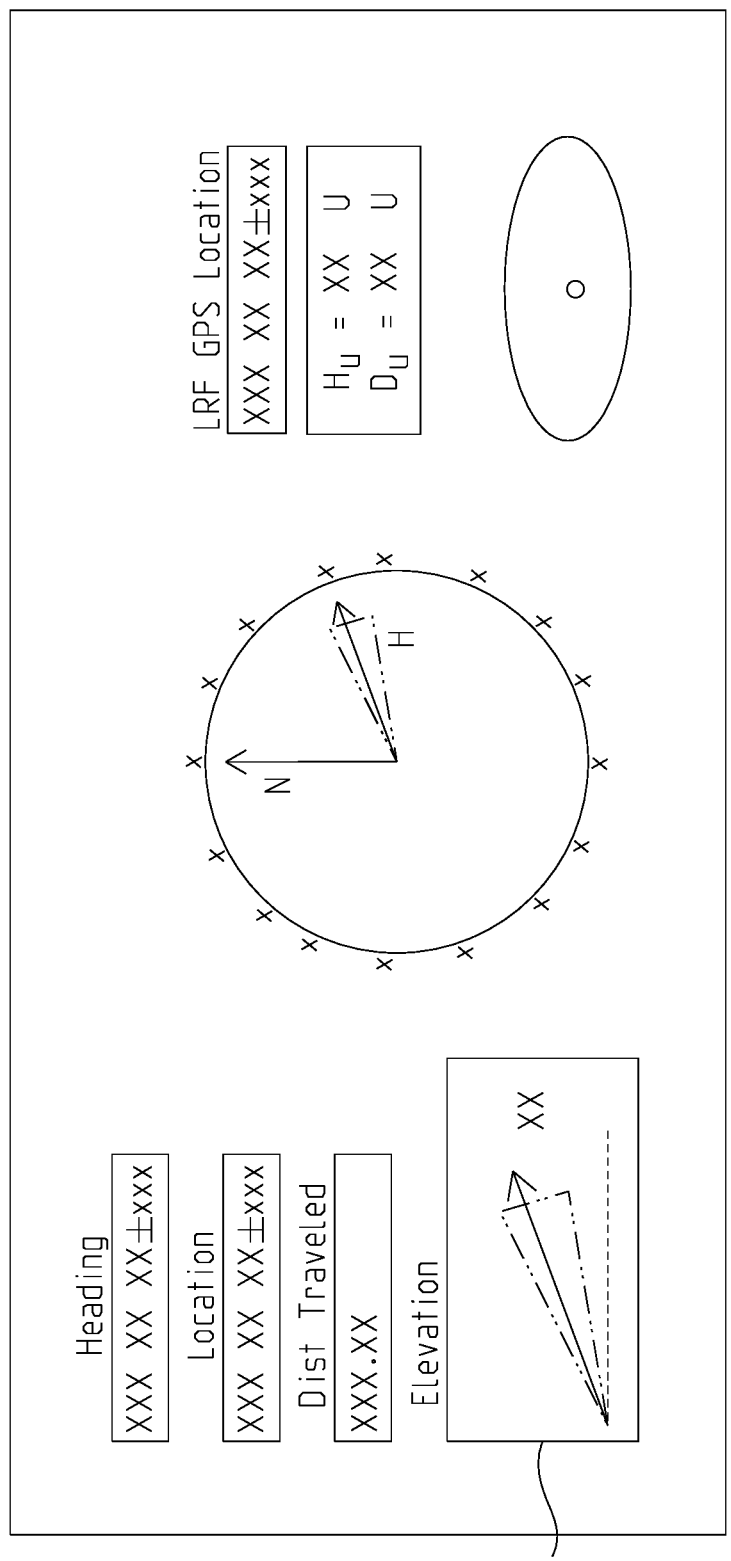
FIG. 10 shows a navigation display device with laser range finder in accordance with another embodiment of the invention.

FIG. 10 shows a navigation display device with laser range finder in accordance with another embodiment of the invention. An exemplary embodiment includes Digital Display of Heading of Device Orientation In Degrees, Minutes, Seconds, or Degrees Decimal±Current uncertainty in heading/orientation. The exemplary embodiment display also includes Current GPS location in In Degrees, Minutes, Seconds, or Degrees Decimal±Current uncertainty in location. Distance traveled+units is also shown. An exemplary embodiment also includes symbol which can represent elevation orientation with respect to local gravity field or the down direction. Shading represents uncertainty in elevation. XX=Digital display of elevation 0°=Flat 90°=straight up. An exemplary display also can include a compass style representation of Heading/Orientation, N=True North, H=Heading/Orientation, Little 'x'=Degrees on the compass, and Shaded triangle=Uncertainty in heading. An exemplary display also includes LRF=Laser Ranger Finder and LRF GPS Location refers to the GPS coordinates of a target that LRF is being used on. An exemplary embodiment display includes Hu as horizontal uncertainty in the LRF GPS, Location with 'U' being the units that 'XX' is being measured in, and Du is the down range uncertainty in the LRF GPS Location with 'U' being the units that 'XX' is being measured in. an exemplary embodiment can also include Graphical representation of Hu and Du. An exemplary embodiment can include a black dot at center equals that the LRF GPS Location.

Figure 11:
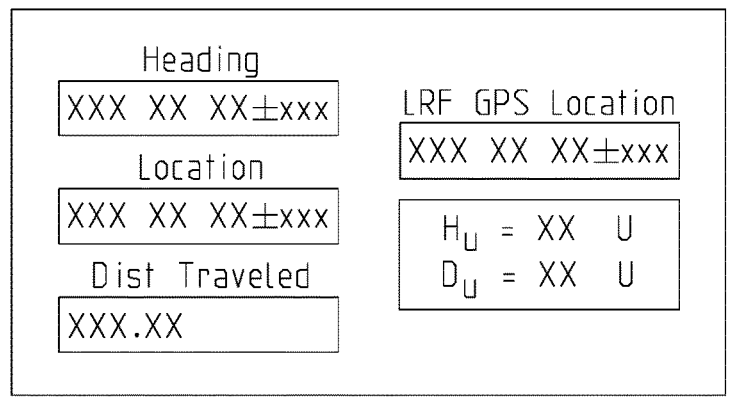
FIG. 11 shows another exemplary embodiment display including a minimal display with a laser range finder.

FIG. 11 shows another exemplary embodiment display including a minimal display with a laser range finder. An exemplary embodiment can include a Digital Display of Heading of Device Orientation, Current GPS location in Degrees, Minutes, Seconds, or Degrees Decimal±Current uncertainty in location. An exemplary display can show results in Degrees, Minutes, Seconds, or Degrees Decimal±Current uncertainty in heading/orientation. A display embodiment can also include LRF=Laser Ranger Finder where LRF GPS Location refers to the GPS coordinates of a target that LRF is being used on. An exemplary embodiment can also show Hu as the horizontal uncertainty in the LRF GPS Location with 'U' being the units that 'XX' is being measured in. An exemplary embodiment can show Du as a down range uncertainty in the LRF GPS Location with 'U' being the units that 'XX' is being measured in.

Figure 12A:
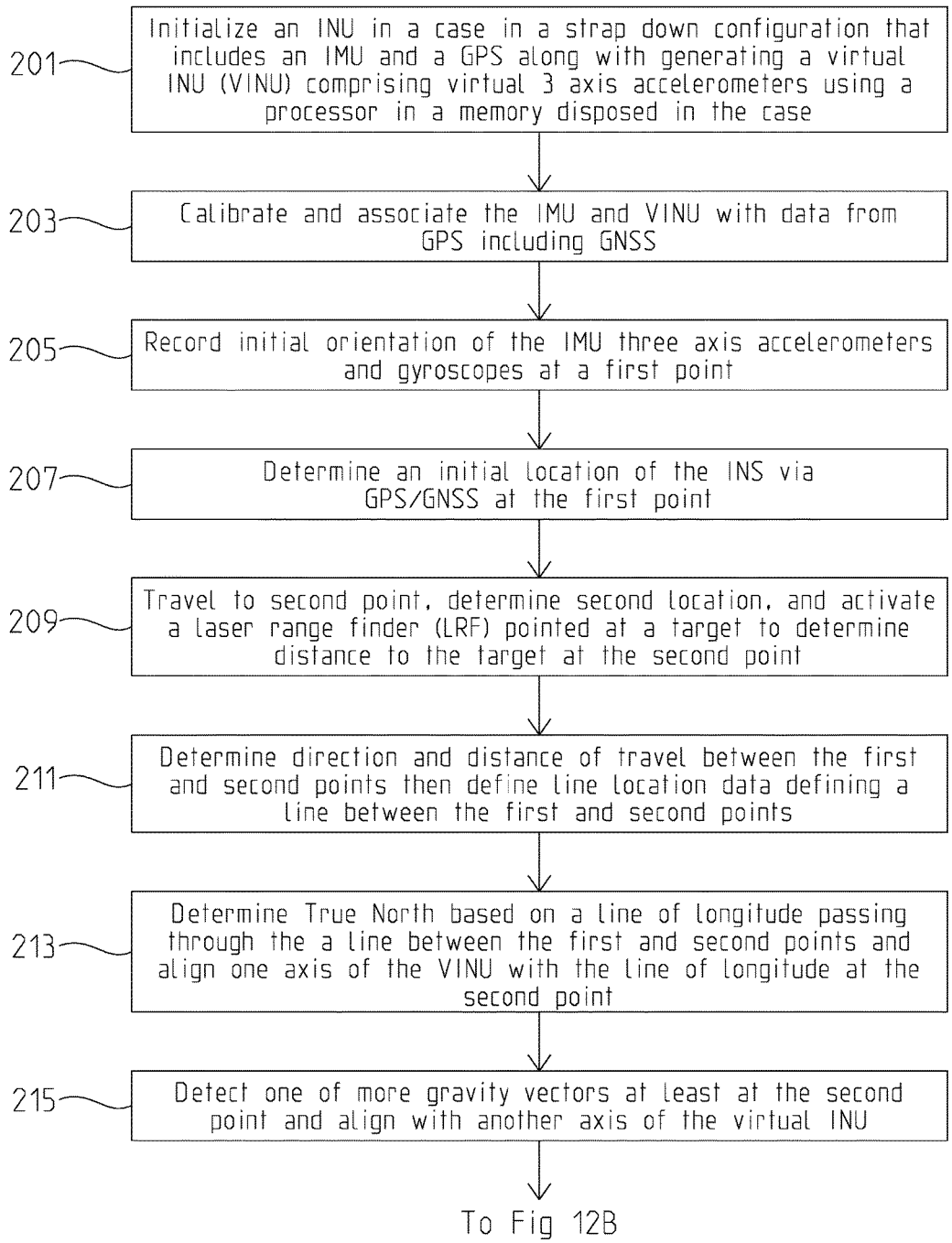
FIGS. 12A and 12B show a method of operation in accordance with one embodiment of the invention.
Figure 12B:
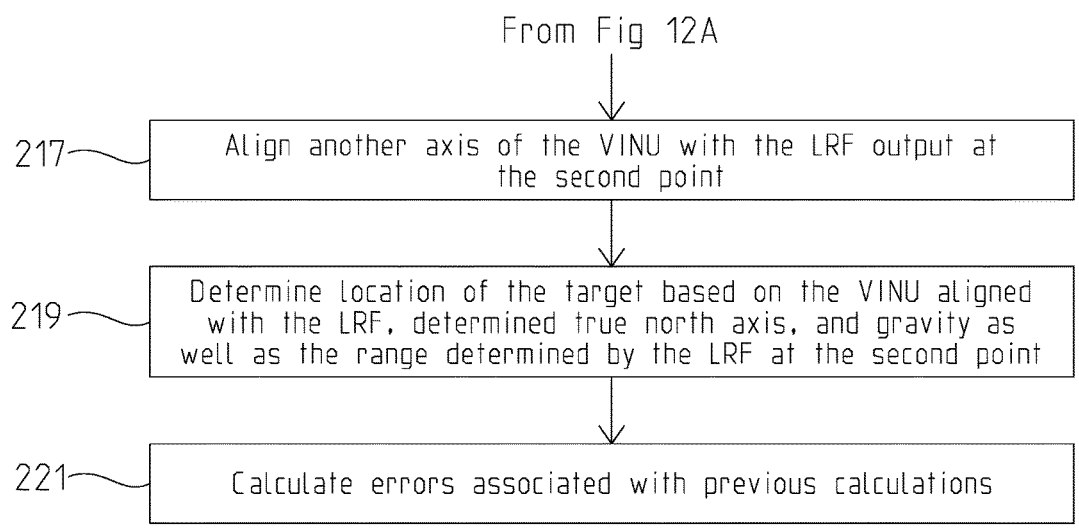

FIG. 12A displays a method of operation in accordance with one embodiment of the invention. At step 201: Initialize an INU that includes an IMU as well as a virtual INU (VINU) comprising virtual 3 axis accelerometers. At step 203: Calibrate and associate the IMU and VINU with data from GPS including GNSS. At step 205: Record initial orientation of the IMU three axis accelerometers and gyroscopes. At step 207: Determine initial location of the INS via GNSS at a first point. At step 209: Travel to second point. At step 211: Determine direction and distance of travel between the first and second points then define line location data defining a line between the first and second points. At step 213: Determine True North based on a line of longitude passing through the a line between the first and second points and align one axis of the VINU with the line of longitude at the second point. At step 215: Detect one or more gravity vectors and align with another axis of the virtual INU. Continuing at FIG. 12B, at step 217: Align another axis of the VINU with the laser range finder laser (LRF) output at the second point. At step 219: Determine location of the target based on the VINU aligned with the LRF, determined true north axis, and gravity as well as the range determined by the LRF at the second point. At step 221: Calculate errors associated with previous calculations.

An exemplary embodiment can include calculations capable of deriving a compass heading via an IMU/GPS integrated unit without magnetic calibration and to do so with sufficient accuracy as to be practical to use as a pedestrian carried device.

Although the invention has been described in detail with reference to certain preferred embodiments, variations and modifications exist within the spirit and scope of the invention as described and defined in the following claims.

The invention claimed is:

1. A remote geolocation system, comprising:
   a case comprising an inertial navigation unit (INU) having orthogonally disposed three axis accelerometers/gyroscopes in a strap down configuration in the case;
   a laser range finder (LRF) aligned with one INU axis;
   a global positioning satellite (GPS);
   a display;
   a processor configured to execute a plurality of Non-Transitory Machine Readable Instructions (NTMRI);
   a storage medium storing the plurality of NTMRI that create a virtual INU (VINU) used to determine orientation of the case at an activation point (AP) when the LRF is pointed at a target, take a sequence of GPS location data and inertial measuring unit (IMU) orientation measurements from a starting location to the AP, draw a line between the starting location and the AP, identify a longitude line (LL) passing through the line, aligns one VINU axis with the LL, aligns another VINU axis with INU detected gravity, and aligns a remaining VINU axis with the LRF's output at the AP, wherein the aligned VINU axis, GPS location at the AP, and LRF range data for the target is used to determine latitude, longitude, and elevation of the target.

2. A remote geolocation system, comprising an apparatus comprising a case that comprises an INU comprising an inertial navigation system (INS) or an IMU comprising three axis accelerometers and three axis gyroscopes in a strapped-down configuration in the case with one INU axis aligned with a laser output of the laser range finder and the three INU axis are disposed orthogonal with each other, the case further includes a GPS, a control system, and a machine readable recording medium storing a plurality of non-transitory machine readable instructions adapted to generate a VINU, determines an orientation of the IMU at a selected point with respect to the Earth based on position determinations using the GPS and IMU orientation data acquired at each said position determination along a displaced path which are used to determine true north data that is used to align one axis of a virtual IMU (VIMU), another VIMU axis is aligned with gravity based on IMU outputs, and another VIMU axis is aligned with the laser rangefinder when pointed at a target and activated, the plurality of non-transitory machine readable instructions further determine position of the target comprising latitude, longitude, and elevation when the laser range finder is activated based on the VIMU, the plurality of machine readable instructions further comprise an error determination module which determines an error value of the position of the target.

3. A system as in claim 2, wherein the location includes elevation of the apparatus at each point of the sequence of measurements.

4. A system as in claim 2, wherein the selected orientation of the apparatus at a desired point comprises a first point at which a predetermined accurate orientation value is determined.

5. A system as in claim 4, wherein the desired orientation is true north and the predetermined accuracy is less than five angular mil degrees accuracy.

6. A system as in claim 2, wherein the sequence of measurements can include at least two measurements along a path of travel which is not purely vertical in elevation.

7. A remote geolocation system comprising:
- a case formed with a pointing alignment structure;
- a laser range finder coupled with the case aligned with the pointing alignment structure;
- a display disposed into the case that displays a plurality of graphical user interfaces;
- an INU including an IMU placed into a strap down configuration within the case comprising three axis accelerometers, three axis gyroscopes, with an x-axis of the accelerometer and gyroscope axis aligned with the alignment structure and the laser range finder's pointing axis;
- a machine readable storage medium that stores a plurality of machine readable instructions;
- a processor coupled within the case in communication with the INU and laser range finder (LRF) which is configured to read the plurality of machine readable instructions and data structures stored in the machine readable recording medium;
- a control section including a trigger or control that receives an activation input from a user which activates the laser range finder to determine distance to a target when the user points the alignment structure at a target; and
- a plurality of machine readable instructions comprising a first plurality of machine readable instructions that operates the INU, IMU and GPS;
- a second plurality of machine readable instructions configured to generate a virtual INU including a three axis x, y, and z data model;
- a third plurality of machine readable instructions that creates a three dimensional georeferenced map model comprising latitude and longitude information overlaid over terrain that the case is traversed over;
- a fourth plurality of machine readable instructions that selectively starts recording latitude and longitude data of the case at a plurality of stored location points starting at an initial location point selected by the user using the control section or the graphical user interface along a displacement path that the user carrying the case passes over ending in a final location point;
- a fifth plurality of machine readable instructions that receives a remote georeferenced determination activation from the control section or one of the graphical user interfaces which activates the laser rangefinder to obtain a target distance measurement between the case and the target at the final location point and determines a path line between the initial location point and the final location point then selects and stores a line of longitude from the map model which passes through the path line as a selected line of longitude data;
- a sixth plurality of machine readable instructions that rotates the VINU via a rotational matrix so that it rotates the VINU axis data to rotate/align the VINU's z axis based on inputs from the INU including z axis INU sensor output detecting gravity to rotate the VIMU's x, y, and z to co-align respective z-axis;
- a seventh plurality of machine readable instructions that rotates or aligns the VINU y axis with the with the selected line of longitude data;
- an eighth plurality of machine readable instructions that aligns the x axis of the VINU with the laser range finder axis as it points at the target at the final location point;
- a ninth plurality of machine readable instructions that remotely determines the target's latitude, longitude and elevation based on target distance measurement, the final location point, and the virtual IMU's three axis that has been aligned with detected gravity, the selected line of longitude, and the laser range finder's axis that was pointing at the target at the final location point; and
- an error determination module which determines an error value of the position of the target.

* * * * *